United States Patent
Yang et al.

(10) Patent No.: US 6,647,634 B2
(45) Date of Patent: Nov. 18, 2003

(54) RELIABLY SENSING BUBBLE LEVELING MEANS

(76) Inventors: Sue-Zeng Yang, No. 134, Kai-Lan Road, Tou-Cheng Chen, I-Lan Hsien (TW); Hou-Ging Chin, No. 134, Kai-Lan Road, Tou-Cheng Chen, I-Lan Hsien (TW)

( * ) Notice: Subject to any disclaimer, the term of this patent is extended or adjusted under 35 U.S.C. 154(b) by 0 days.

(21) Appl. No.: 10/143,425
(22) Filed: May 7, 2002
(65) Prior Publication Data
US 2002/0189116 A1 Dec. 19, 2002
(30) Foreign Application Priority Data
Jun. 13, 2001 (TW) ........................ 90209848 U
(51) Int. Cl.[7] ............................ G01C 15/10; G01C 9/36
(52) U.S. Cl. .................. 33/390; 33/366.23; 33/366.16
(58) Field of Search ................ 33/366.26, 366.16, 33/377, 379, 389, 390, 340, 341, 348, 348.2, 365

(56) References Cited

U.S. PATENT DOCUMENTS

| | | | | |
|---|---|---|---|---|
| 4,484,393 A | * | 11/1984 | LaFreniere | 33/348.2 |
| 4,956,922 A | * | 9/1990 | Bodewes | 33/366.16 |
| 4,993,162 A | * | 2/1991 | Scholian | 33/366.16 |
| 5,101,570 A | * | 4/1992 | Shimura | 33/366.16 |
| 5,111,039 A | * | 5/1992 | Froning | 33/366.16 |
| 5,749,152 A | * | 5/1998 | Goss et al. | 33/390 |
| 5,794,355 A | * | 8/1998 | Nickum | 33/366.16 |
| 5,953,116 A | * | 9/1999 | Ohtomo et al. | 33/366.23 |
| 6,248,989 B1 | * | 6/2001 | Ohishi | 250/205 |
| 6,343,422 B1 | * | 2/2002 | Takahashi | 33/366.16 |

* cited by examiner

Primary Examiner—Diego Gutierrez
Assistant Examiner—Yaritza Guadalupe

(57) ABSTRACT

A bubble leveling device includes a bubble level having a gas bubble formed on a liquid surface, an illuminator projecting light through or towards the gas bubble for producing an optical image of the gas bubble, and a sensor having a coordinate screen for locating the image of the gas bubble on the screen for checking the coincidence or deviation of the image with or from the coordinate center of the screen for reliably checking the horizontality or inclination angle as measured by the bubble leveling device.

4 Claims, 3 Drawing Sheets

RELIABLY SENSING BUBBLE LEVELING MEANS

BACKGROUND OF THE INVENTION

A conventional bubble level may be used for checking horizontality or verticality. The bubble level includes a sealed glass container containing water and a small air bubble existing therein. For obtaining the measurement result, a great error may be caused by the observer's visual reading on the bubble position because of the following factors:

1. The deviation or difference of angle of view when observing the bubble position in the level may be caused from time to time by same or different observers;
2. The readings of the measurement results may also be different as effected by the variation of incoming light directions or angles or the different light intensity in the measurement environment.
3. It is lacking of additional systematic equipments provided for optically or electronically sensing or recording the measurement result.

The present inventor has found the drawbacks of conventional bubble level and invented the present bubble leveling means for reliably sensing the measurement result.

SUMMARY OF THE INVENTION

The object of the present invention is to provide a bubble leveling device including a bubble level having a gas bubble formed on a liquid surface, an illuminator projecting light through or towards the gas bubble for producing an optical image of the gas bubble, and a sensor having a coordinate screen for locating the optical image of the gas bubble on the screen for checking the coincidence or deviation of the image with or from the coordinate center of the screen for reliably checking the horizontality or inclination angle as measured by the bubble leveling device.

DETAILED DESCRIPTION

Figure 1:
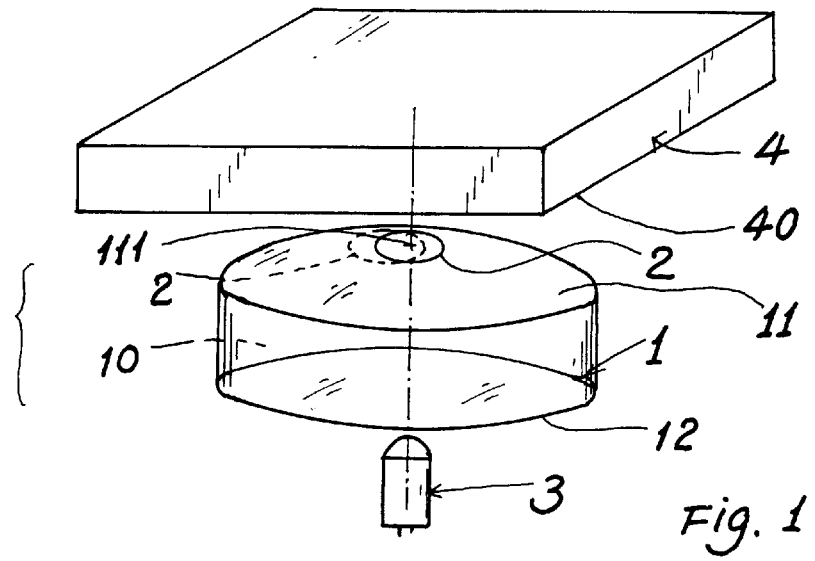
FIG. 1 is a perspective view of the present invention.
Figure 2:
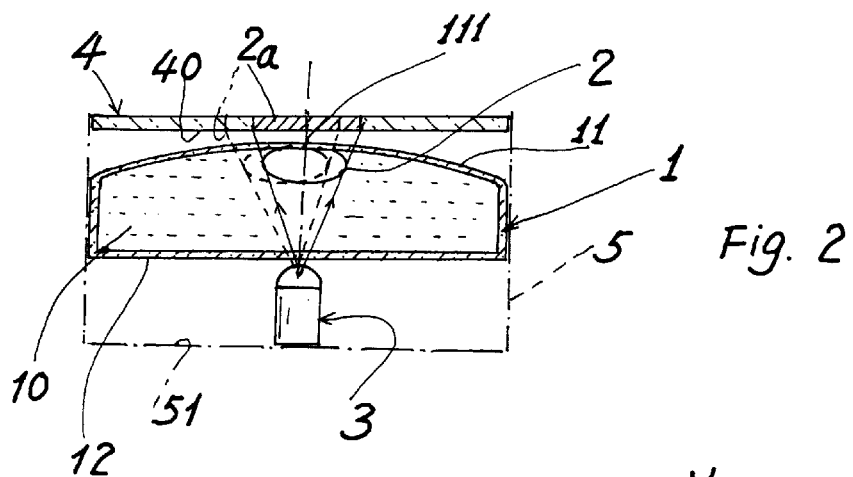
FIG. 2 is a sectional drawing of the present invention.
Figure 3:
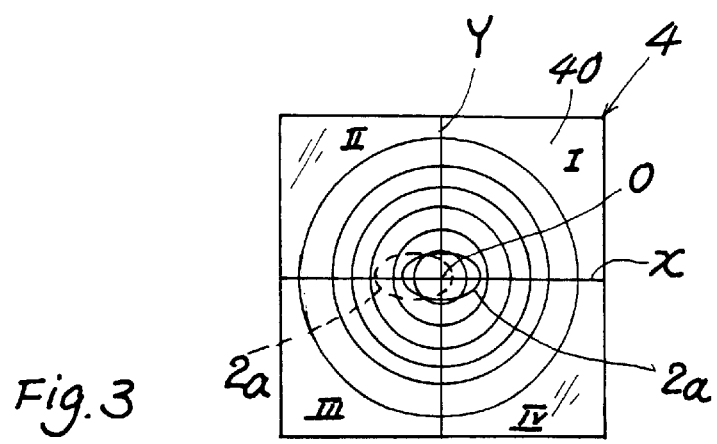
FIG. 3 shows an image of the bubble as displayed on a screen of the present invention.

As shown in FIGS. 1~3, the present invention comprises: a closed bubble level 1 having a gas (or air) bubble 2 floating on a liquid 10 filled in the level 1, an illuminator 3 positioned under the bubble level 1, a sensor 4 positioned above the bubble level 1 for displaying the image of the bubble 2 from the bubble level 1, and a housing 5 encasing all elements as aforementioned into the housing 5. Naturally, the bubble level may itself form a housing (casing) for attaching or securing the illuminator 3 and the sensor 4 thereto (or therein). The housing 5 provides a planar or flat bottom surface 51 preferably parallel to the flat bottom surface of the bubble level 1.

The bubble level 1 includes: a transparent upward-concave arcuate top wall 11 having a smooth arcuate inside surface formed on an upper portion of a bottom wall 12 which may be formed as transparent flat wall plate; a transparent liquid 10, which may be ether or alcohol, filled in the bubble level 1; and a gas (or air) bubble 2 suspending (or formed) on the liquid 10 and operatively moving along the inside surface of the upward-concave arcuate top wall 11 towards a central apex portion 111 of the arcuate top wall 11 indicating that the bubble level 1 is now horizontally positioned; with the illuminator 3 positioned under the bottom wall 12 of the bubble level 1 and the sensor 4 positioned above the bubble level 1; whereby upon projection of light from the illuminator 3 through the gas bubble 2 in the bubble level 1, an optical image of the gas bubble 2 will be displayed on the sensor 4.

The illuminator 3 may be firmly secured to the bottom wall 12 of the bubble level 1 and secured in the housing 1. The illuminator 3 may be a laser diode illuminator or an electric lamp, not limited in this invention.

The illuminator 3 may be powered by at least a battery (not shown) stored in the housing or may be powered as electrically connected to a municipal utility (power supply) system.

The sensor 4 for receiving or displaying the optical image of the gas bubble includes: a screen 40 especially as shown in FIG. 3 having scales, graduations or matrix of a coordinate consisting of abscissa X and ordinate Y formed on the screen 40, a coordinate center O intersected by abscissa X and ordinate Y and four quadrants I, II, III, IV defined by the abscissa and ordinate; whereby upon projection of light from the illuminator 3 through the gas bubble 2 in the bubble level 1, an optical image 2a of the gas bubble 2 will be displayed on the screen 40; and upon coincidence of the optical image 2a of the gas bubble 2 with the coordinate center O on the screen 40, a horizontality is obtained or measured by the bubble level 1; and upon moving (or falling) of the optical image 2a of the gas bubble 2 in anyone quadrant of the coordinate, a deviation of inclination angle from the horizontality of the bubble level 1 is measured and displayed on the screen 40.

The optical image 2a of the gas bubble 2 as shown in full line in FIG. 3 indicates the bubble level 1 has obtained a horizontality; while the optical image 2a as shown in dotted line of FIG. 3 indicating an angular deviation from the horizontality in accordance with the present invention.

When the present invention is measured to obtain a horizontality, the optical image 2a of the gas bubble 2 ("staying" at the apex 111 of the top wall 11) will be coincided with the coordinate center O on the screen 40 of the sensor 4.

When the level 1 is placed on an inclined surface other than a horizontal plane, the gas bubble 2 will move along an arcuate inside surface of the upward-concave arcuate top wall 11 of the bubble level 1 from the apex 111 of the top wall 11 and the optical image 2a of the gas bubble 2 as displayed on the screen 40 will correspondingly move on the screen 40 to reach a quadrant of the coordinate on the screen 40 to be deviated from the coordinate center O, thereby obtaining deviation of inclination angle from the horizontality of the bubble level 1.

Since the gas bubble 2 presents an optical divergence at its central area, the image 2a of the gas bubble 2 as projected on the screen 40 may obtain a magnified image along the contour of the gas bubble, which is beneficial for checking, comparison or calibration purpose.

Since the inclination angle as deviated from the horizontality is now referred to an optical image as displayed on the screen 40 which may be formed as a flat or planar layer, the reading errors as visually observed from different viewing angles or by different observers can now be eliminated.

So, the present invention provides a leveling instrument for checking horizontality or inclination angle as deviated from the horizontality in a more reliable way than a conventional bubble level gauge.

Figure 4:
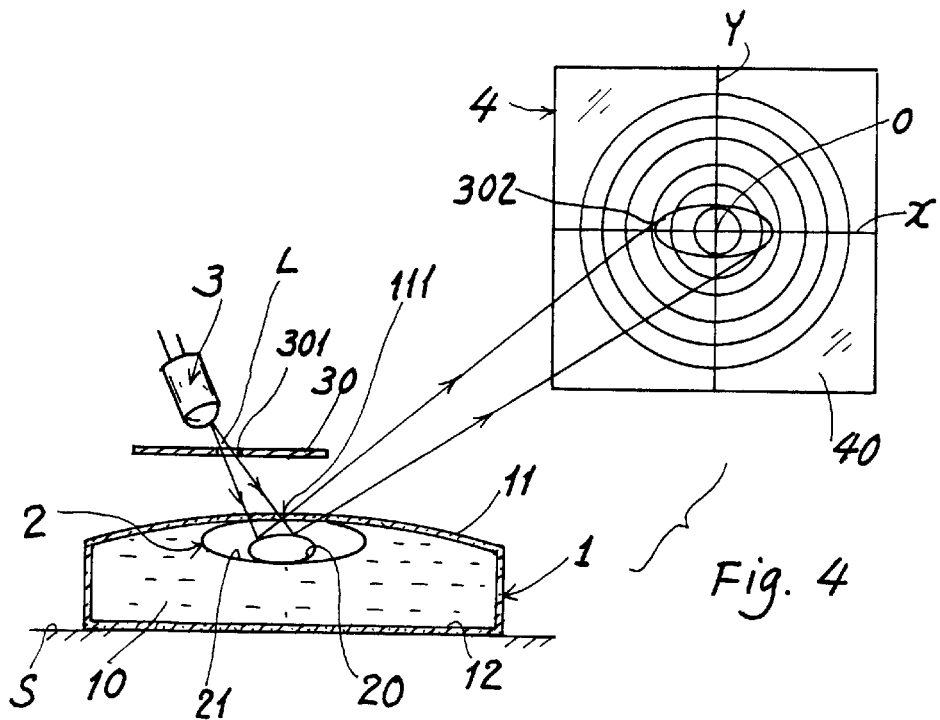
FIG. 4 shows another preferred embodiment of the present invention.

Another preferred embodiment of the present invention is shown in FIG. 4, in which the light projecting through the gas bubble 2 to obtain image 2a as projected from the illuminator 3 may be modified to be a light projected from the illuminator 3 towards the gas bubble 2 and then reflected from (a float in) the gas bubble 2 towards the screen 40, of which the details will be described hereinafter.

The bubble level 1 further includes a light-reflective float 20 normally floating on the lowest position in a downward-concave arcuate (smooth) surface 21 of the gas bubble 2. The downward-concave surface 21 is formed because a static equilibrium is established by balancing the gravitational force and the pressure of the liquid and air in the level 1, the surface tension of the liquid, and the cohesion between the liquid and the wall of the level, and any other relevant forces.

The illuminator 3 further includes: a photo mask 30 having an aperture 301 formed in the photo mask 30 for projecting a light beam from the illuminator 3 through the aperture 301 towards the float 20 floating in the gas bubble 2 in the bubble level 1, whereby the light beam L as projected through the aperture 301 will be reflected by the light-reflective float 20 towards the screen 40 to form an optical image 302 of the light beam L to be displayed on the screen 40 of the sensor 4, which is the same as the sensor 4 as shown in FIGS. 1~3; and when a horizontality is measured (sensed) by the present invention such that a flat bottom wall 12 of the level 1 is horizontally laid on a surface S which is horizontal as shown in FIG. 4 and the gas bubble 2 reaches the apex 111 of the level 1, the optical image 302 displayed on the screen 40 will be coincided with the coordinate center O; and upon tilting of the bubble level 1, the float 20 as floating on the downward-concave arcuate surface 21 in the gas bubble 2 will be moved corresponding to the movement of the gas bubble 2 in the bubble level 1 so that the deviation of the optical image 302 on the screen from the coordinator center O will correspond to the deviation of inclination angle from the horizontality of the bubble level 1, thereby obtaining a reliable checking of horizontality or angular deviation from the horizontality.

The optical image 302 of the light beam L through the aperture 301 in the photo mask 30 is magnified by a light leverage effect to enhance a clear observation or reading of the measurement result on the screen 40 of the sensor.

Figure 5:
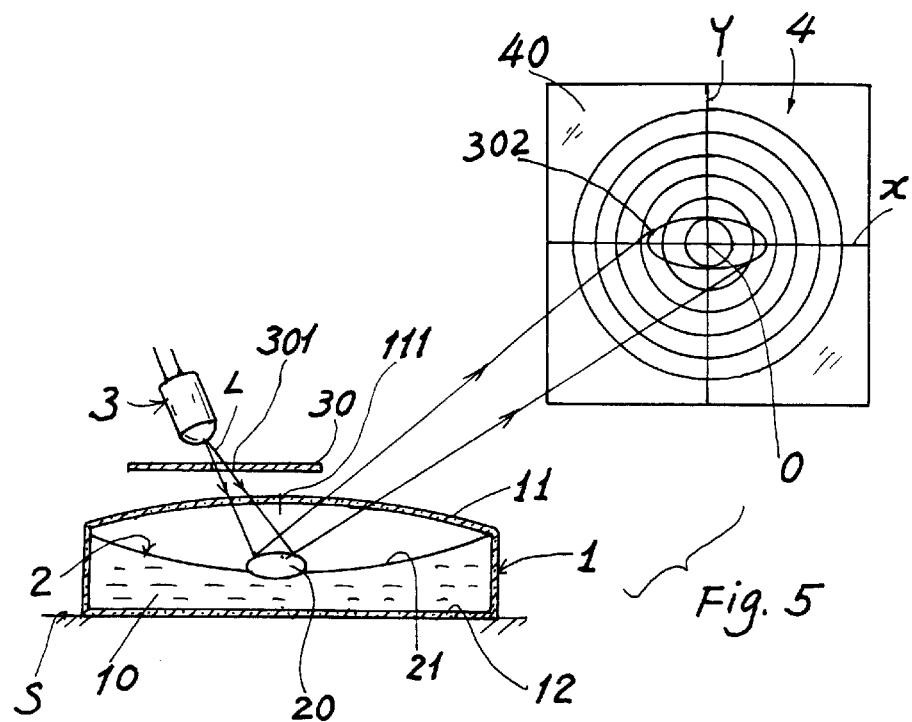
FIG. 5 is a modification of the embodiment of FIG. 4.

As shown in FIG. 5, the gas bubble 2 is modified to be "bigger" than that as shown in FIG. 4 and the volume of liquid 10 has been greatly reduced, and wherein the gas bubble 2 merely reveals its downward-concave arcuate surface 21 of the bubble 2 and the light-reflective float 20 floating on the arcuate surface 21 will move to respond the horizontality or angular inclination of the bubble level 1 of the present invention. The downward-concave surface 21 is thus formed because the cohesion force between the liquid 10 and the wall of the bubble level 1 is greater than the surface tension force of the liquid 10.

Figure 6:
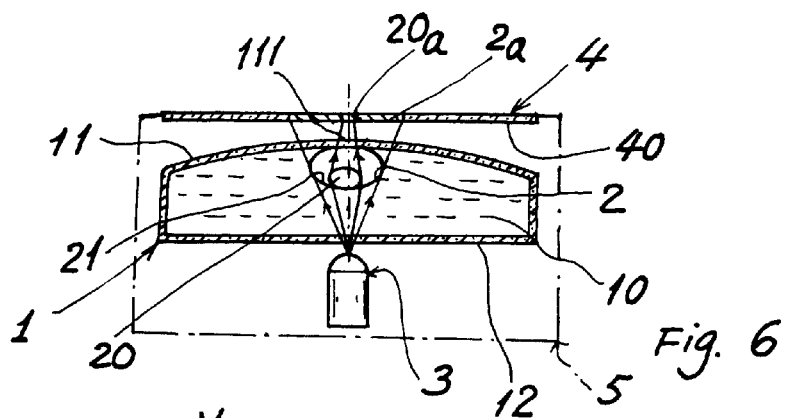
FIG. 6 shows still another preferred embodiment of the present invention.
Figure 7:
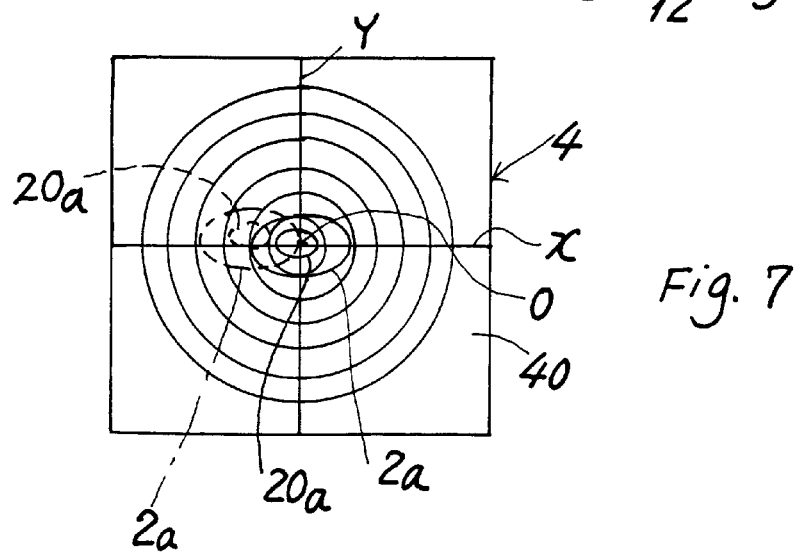
FIG. 7 is an illustration of the image shown on the screen of the embodiment of FIG. 6.

As shown in FIGS. 6 and 7, still another preferred embodiment of the present invention is formed, in which the aforementioned elements as described in the first preferred embodiment as shown in FIGS. 1~3 may be applied herewith, except that a float 20 is however provided in the level 1 to be floated on the liquid 10.

The float 20 is normally floated on the lowest position of the downward-concave arcuate surface 21 of the gas bubble 2 because of static equilibrium of the relevant elements or fluids in the bubble level 1.

The float 20 as shown in FIG. 6 may be formed as light-convergent float 20 which may be a focusing lens for focusing light projected from the illuminator 3, positioned under the bottom wall 12 of the bubble level 1, towards the screen 40 to form a focused optical image 20a of the float 20 (FIG. 7) which is positioned at the center of the optical image 2a of the gas bubble 2 simultaneously projected by the light as emitted from the illuminator 3. Upon obtaining a horizontality by the present invention, the gas bubble 2 may reach the apex 111 of the bubble level 1 and the optical image 20a of the float 20 as projected by the light from the illuminator 3 will be focused at the coordinate center O on the screen 40 as shown in solid line of FIG. 6; while upon tilting of the level 1, the bubble 2 will move and the float 20 as floating on the lowest position of the arcuate surface 21 of the bubble 2 will move to cause movement of the optical image 20a of the float 20 as focused on the screen 40 (dotted line on FIG. 7), thereby showing a deviation from the coordinate center and showing a deviation of inclination angle from the horizontality.

If the float 20 is made as an opaque one, the light as projected through the opaque float 20 will form an annular optical image on the screen having a central dark spot in contrast to a bright background disposed around the central dark spot.

Figure 8:
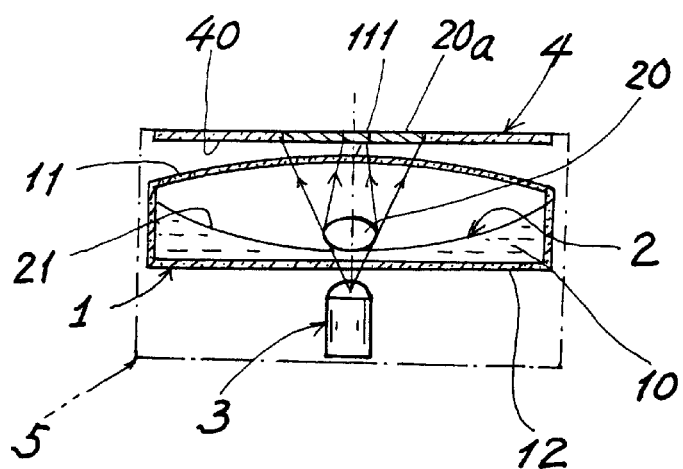
FIG. 8 is a modification of the embodiment as shown in FIG. 6.

As shown in FIG. 8, the gas bubble 2 is modified to be larger than that as shown in FIG. 6 and the liquid 10 in the bubble level 1 is also greatly reduced to form the downward-concave arcuate surface 21 in the level 1. The float 20 is floated on the arcuate surface 21 of the gas bubble 2. An upward-concave arcuate surface of the gas bubble 2 now disappears as shown in FIG. 8.

The optical image as presented or focused on the screen 40 of the sensor 4 may be detected and recorded by a photo sensor or position sensitive detector (PSD) including photo sensor of CCD (charge-coupled device), photo transistor or photodiode.

The embodiments as shown in the accompanying drawings may each be encased in a housing or the bubble level 1 may itself form a housing for incorporating all relevant elements of the present invention into the housing.

The deviation of inclination angle from the horizontality as shown on the screen 40 of the present invention may be converted and indicated as numerical data such as degrees of angles for data processing by an electronic transducer or conversion system in cooperation with the sensor, which may be modified by those having skill in the art and is not limited in the present invention.

The present invention may be modified without departing from the spirit and scope of the present invention.

We claim:

1. A bubble leveling means comprising:
   a closed bubble level having a liquid filled in the level, a gas bubble floating on the liquid, and a transparent upward-concave arcuate top wall formed on a top of a bottom wall of said level, whereby upon reaching of said gas bubble to a central apex of said upward-concave arcuate top wall, a horizontality is indicated by said level;

a float normally floating on the lowest position in a downward-concave arcuate surface of the gas bubble for producing an optical image of said float on a sensor when optically projected by an illuminator adjacent to said level; and said sensor having a screen adjacent to said level for receiving, displaying and indicating said optical image; whereby upon obtaining the horizontality by said level, said optical image will be presented at a center of said screen; and upon forming an inclination angle as deviated from said horizontality, said optical image will correspondingly move to be deviated from the center on said screen for indicating the inclination angle.

2. A bubble leveling means according to claim 1, wherein said float in said bubble level is a light-reflective float normally floating on the lowest position in the downward-concave arcuate surface of the gas bubble for producing said optical image of said float on said sensor when optically projected by the illuminator.

3. A bubble leveling means according to claim 2, wherein said illuminator further includes: a photo mask having an aperture formed in the photo mask for projecting a light beam from the illuminator through the aperture towards the float floating in the gas bubble in the bubble level, whereby the light beam as projected through the aperture will be reflected by the light-reflective float towards a screen of the sensor to form said optical image on the screen of the sensor.

4. A bubble leveling means according to claim 1, wherein said float is a light-convergent float for focusing light from the illuminator, positioned under a bottom wall of the bubble level, towards the screen to form a focused optical image of the float which is positioned within an optical image of the gas bubble simultaneously projected by the light as emitted from the illuminator.

* * * * *